United States Patent
Blair

(10) Patent No.: US 8,889,583 B2
(45) Date of Patent: Nov. 18, 2014

(54) CATALYST PRODUCTION

(75) Inventor: Christopher David Blair, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 976 days.

(21) Appl. No.: 12/560,730

(22) Filed: Sep. 16, 2009

(65) Prior Publication Data

US 2011/0065571 A1    Mar. 17, 2011

(51) Int. Cl.
*B01J 31/06*    (2006.01)

(52) U.S. Cl.
CPC ....................................... *B01J 31/06* (2013.01)
USPC ....................................................... 502/159

(58) Field of Classification Search
None
See application file for complete search history.

(56) References Cited

U.S. PATENT DOCUMENTS

| | | | |
|---|---|---|---|
| 2,929,792 A * | 3/1960 | Arnold et al. | 502/159 |
| 3,369,894 A * | 2/1968 | Yu | 430/248 |
| 4,742,137 A * | 5/1988 | Ono et al. | 526/92 |
| 5,227,460 A | 7/1993 | Mahabadi et al. | |
| 5,346,797 A | 9/1994 | Kmiecik-Lawrynowicz et al. | |
| 5,364,729 A | 11/1994 | Kmiecik-Lawrynowicz et al. | |
| 5,403,693 A | 4/1995 | Patel et al. | |
| 5,418,108 A | 5/1995 | Kmiecik-Lawrynowicz et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,853,943 A | 12/1998 | Cheng et al. | |
| 7,307,111 B2 | 12/2007 | Moffat et al. | |
| 7,481,968 B2 | 1/2009 | Shimizu et al. | |
| 7,534,287 B2 | 5/2009 | Zeller et al. | |
| 2005/0165133 A1* | 7/2005 | Sacripante et al. | 523/335 |
| 2006/0269858 A1 | 11/2006 | McDougall et al. | |
| 2007/0037086 A1 | 2/2007 | Skorokhod et al. | |
| 2007/0207400 A1 | 9/2007 | Ahuja et al. | |

OTHER PUBLICATIONS

Ito et al, Study of particle growth by seeded emulsion polymerization accompanied by electrostatic coagulation, colloids and surfaces, 2002, pp. 131-142.*

* cited by examiner

*Primary Examiner* — Melvin C Mayes
*Assistant Examiner* — Stefanie Cohen
(74) *Attorney, Agent, or Firm* — Marylou J. Lavoie

(57) ABSTRACT

The present disclosure utilizes an emulsion aggregation (EA) process to produce ceramic catalysts of controlled surface area, in particular, extremely high surface area powders. In embodiments, resins are utilized to form resin catalysts including the active catalysts. These resin catalysts may be in powder form, having a high surface area. The particle size, particle size distribution, and shape of the produced powders can be controlled to a great degree. In embodiments, the powders can also be made porous.

21 Claims, No Drawings

CATALYST PRODUCTION

BACKGROUND

The present disclosure relates to processes useful in providing catalysts having a high surface area.

Active catalysts may be used in many applications, for example, air filtration, effluent pollution control, hydrocarbon cracking, and solid oxide fuel cells. For some applications, it may be desirable to control the surface area of the catalyst material, in order to control the catalysis rate. Thus, a very high surface area may be desirable to provide very fast reactions. For example, many materials exist that are useful as anodes and cathodes in solid oxide fuel cells (SOFC). Such materials include nickel oxide, various compounds of La, Sr, Mn, O, Ni, Co, Zr, Y, and the like, as well as combinations thereof including such as $La_{0.75}Sr_{0.25}Cr_{0.5}Mn_{0.5}O_3$. These materials may be deposited onto ceramic backbone particles, such as yttrium stabilized zirconia (YSZ), of controlled size, shape and porosity to generate large surface area materials coated by a thin layer of electrode material in a so-called "supported electrode" construction of SOFC.

Processes to coat ceramic backbone materials in supported electrode SOFC, including physical or chemical vapor deposition techniques, are expensive.

Emulsion aggregation is a process that may be used, in some instances, to produce toners for electrostatographic apparatuses. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650,255, 5,650,256 and 5,501,935, the disclosures of each of which are hereby incorporated by reference in their entirety.

Improved methods for producing catalysts, which reduce environmental concerns and increase the effectiveness of the catalyst by providing catalysts with a high surface area, as well ability to tailor the catalyst structure, remain desirable.

SUMMARY

The present disclosure provides ceramic catalysts and methods for making same. In embodiments, a process of the present disclosure may include adding at least one component including a catalyst such as ceramics, metals, and cermets to a reactor; adding an emulsion including monomer components of a latex resin to the reactor; optionally adding an initiator to the reactor; optionally adding additional ceramics, metals, cermets, and combinations thereof, and additional monomers including monomer components of a latex resin to the reactor; and recovering the resulting resin catalyst particles.

In embodiments, a process of the present disclosure may include adding at least one ceramic including a catalyst to a reactor; adding an emulsion including monomer components of a latex resin to the reactor; optionally adding an initiator to the reactor; optionally adding additional ceramics and additional monomers of a latex resin to the reactor; recovering the resulting resin catalyst particles; and sintering the resin catalyst particles by heating to a temperature of from about 400° C. to about 1600° C. to obtain catalyst particles.

In yet other embodiments, a process of the present disclosure may include adding at least one ceramic including a catalyst such as copper oxide, manganese oxide, cerium oxide, cerium (V) oxide, silicon dioxide, nickel oxide, nickel (III) oxide, lanthanum strontium, chromium, manganese, copper, yttrium, zirconium, yttrium stabilized zirconia, calcium stabilized zirconia, cobalt, titanium, vanadium, zinc, molybdenum, and combinations thereof, to a reactor; adding an emulsion including monomer components of a latex resin such as styrenes, acrylates, methacrylates, butadienes, isoprenes, acrylic acids, methacrylic acids, acrylonitriles, and combinations thereof to the reactor; contacting the emulsion in the reactor with a stabilizer of the following formula:

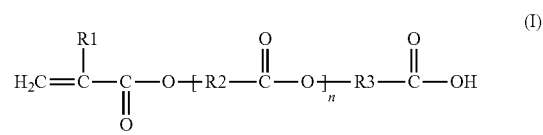

where R1 is a hydrogen or methyl group; R2 and R3 are independently selected from alkyl groups containing from about 1 to about 12 carbon atoms and a phenyl group; and n is a number of from about 0 to about 20; optionally adding an initiator to the reactor; adding additional ceramics and additional monomers of a latex resin to the reactor; recovering the resulting resin catalyst particles; and sintering the resin catalyst particles by heating to a temperature of from about 400° C. to about 1600° C. to obtain catalyst particles.

DETAILED DESCRIPTION OF EMBODIMENTS

The present disclosure provides methods for producing catalysts having a high surface area, which include an emulsion aggregation process to create a polymer capable of holding together ceramic, metal, or a combination of ceramic and metal, sometimes referred to herein, in embodiments, as a cermet, particles containing catalyst materials, or ceramic, metal or cermet particles that are, themselves, catalysts, prior to sintering.

In embodiments, a ceramic, metal or cermet, which itself is a catalyst or contains a catalyst, may be utilized as a seed particle in the formation of resins including the catalyst/ceramic. These resins, in turn, may then be sintered to form particles having a high surface area that include the catalysts.

While the resin may be prepared by any method within the purview of one skilled in the art, in embodiments the resin may be formed as part of a latex prepared by emulsion aggregation methods. Emulsion aggregation involves aggregation of submicron latex and ceramic, metal or cermet particles into an appropriate size, where the growth in particle size is, for example, submicron, in embodiments from about 100 nm to about 10 microns. In embodiments, the latex including the catalyst may be produced by a semi-continuous polymerization process in which the ceramic is utilized as a seed particle, after which monomers and materials utilized to form the latex may be added. The resulting latex, in turn, may be then treated to form the powdered catalysts of the present disclosure.

Seed Particles/Catalysts

In accordance with the present disclosure, a ceramic, metal, and/or cermet catalyst may be utilized as a seed particle to form a resin of the present disclosure. The ceramic, metal, and/or cermet either is the catalyst, or acts as a support to hold the catalyst, during the catalysis reaction. Examples of suitable catalysts include, but are not limited to, copper oxide, manganese oxide, cerium oxide, including cerium (V) oxide, silicon dioxide, nickel oxide, including nickel (III) oxide, cobalt, titanium, vanadium, zinc, molybdenum, lanthanum, strontium, chromium, manganese, copper, yttrium, zirconium, yttrium stabilized zirconia, calcium stabilized zirconia, combinations thereof, and the like. As noted above, the ceramic is utilized as a seed particle for forming resins of the present disclosure including the ceramic and catalyst, which may thus be referred to, in embodiments, as a resin catalyst.

The amount of ceramic utilized in forming a resin catalyst may be from about 1 to about 50 wt %, in embodiments from about 2 to about 25 wt %, in embodiments from about 4 to about 12 wt %.

The ceramic particles may have a size of from about 1 nm to about 1 micron, in embodiments from about 1 nm to about 500 nm, in embodiments from about 2 nm to about 10 nm. In embodiments, the seed particles may be substantially spherical. Sol gel derived seeds may be spherical. BET surface area of a sphere can be calculated by the following equation:

$$\text{Surface Area } (m^2/g) = 6/(\text{Particle Diameter } (um) * \text{Density } (g/cc)).$$

Thus, for example, a spherical nonporous ceramic material having a density of about 4.0 and a 1 nm diameter would have a surface area of about 1500 m$^2$/g surface area. In accordance with the present disclosure, the ceramic particles may have a surface area of from about 1.5 m$^2$/g to about 75 m$^2$/g, in embodiments from about 5 m$^2$/g to about 50 m$^2$/g.

Resin

Any monomer suitable for preparing a latex emulsion can be used in the present processes. Suitable monomers useful in forming the latex emulsion, and thus the resulting latex particles in the latex emulsion include, but are not limited to, styrenes, acrylates, methacrylates, butadienes, isoprenes, acrylic acids, methacrylic acids, acrylonitriles, combinations thereof, and the like, as well as mixtures thereof.

In embodiments, the resin of the latex may include at least one polymer. In embodiments, at least one may be from about one to about twenty and, in embodiments, from about three to about ten. Exemplary polymers include copolymers of styrene and acrylates, copolymers of styrene and butadiene, copolymers of styrene and methacrylates, and more specifically, poly(styrene-co-alkyl acrylate), poly(styrene-co-butadiene), poly(styrene-co-alkyl methacrylate), poly(styrene-co-alkyl acrylate-co-acrylic acid), poly(styrene-co-1,3-butadiene-co-acrylic acid), poly(styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly(alkyl methacrylate-co-acrylic acid), poly(styrene-co-alkyl acrylate-co-acrylonitrile-acrylic acid), poly(styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly (ethyl methacrylate-co-butadiene), poly(propyl methacrylate-co-butadiene), poly(butyl methacrylate-co-butadiene), poly(methyl acrylate-co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate-co-isoprene), poly(butyl methacrylate-co-isoprene), poly(methyl acrylate-co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-co-butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and mixtures and combinations thereof. The polymers may be block, random, grafting, or alternating copolymers.

In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the disclosure of which is hereby incorporated by reference in its entirety), and branched polyester resins resulting from the reaction of dimethylterephthalate with 1,3-butanediol, 1,2-propanediol, and/or pentaerythritol, may also be used.

In embodiments, a poly(styrene-co-butyl acrylate) may be used as the latex resin. The glass transition temperature of this latex may be from about 35° C. to about 75° C., in embodiments from about 40° C. to about 65° C.

Surfactants

In embodiments, the latex may be prepared in an aqueous phase containing a surfactant or co-surfactant. Surfactants which may be utilized with this aqueous phase and result in the formation of a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, disulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., mixtures thereof, and the like. Other suitable surfactants include, in embodiments, DOWFAX™ 2A1, an alkyldiphenyloxide disulfonate from The Dow Chemical Company, optionally in combination with any of the foregoing anionic surfactants.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and dodecyl trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, and the like, and mixtures thereof. In embodiments, a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. In embodiments, commercially available surfactants from Rhone-Poulenc such as IGEPAL CA-210™, IGEPAL CA520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

Stabilizers

In embodiments, it may be advantageous to include a stabilizer when forming the latex resin. Suitable stabilizers include monomers having carboxylic acid functionality. In embodiments, suitable stabilizers may be of the following formula (I):

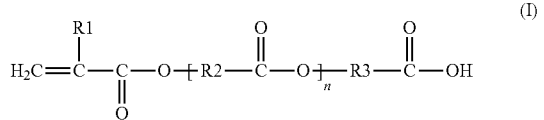

where R1 is hydrogen or a methyl group; R2 and R3 are independently selected from alkyl groups containing from about 1 to about 12 carbon atoms or a phenyl group; and n is from about 0 to about 20, in embodiments from about 1 to about 10. Examples of such stabilizers include beta carboxyethyl acrylate (sometimes referred to herein as poly(2-carboxyethyl) acrylate) (β-CEA), poly(2-carboxyethyl) acrylate, 2-carboxyethyl methacrylate, combinations thereof, and the like.

In embodiments, the stabilizer having carboxylic acid functionality may also contain metallic ions, such as sodium, potassium and/or calcium, to achieve better emulsion polymerization results. The metallic ions may be present in an amount from about 0.001 to about 10 percent by weight of the stabilizer having carboxylic acid functionality, in embodiments from about 0.5 to about 5 percent by weight of the stabilizer having carboxylic acid functionality.

It may be desirable, in embodiments, to include an acrylate such as a beta-carboxyethyl acrylate (β-CEA) in forming the latex. Thus, in embodiments, a poly(styrene-butyl acrylate-beta-carboxyethyl acrylate) may be utilized as the latex. The glass transition temperature of this latex may be from about 45° C. to about 65° C., in embodiments from about 48° C. to about 62° C.

Reaction Conditions

In the emulsion polymerization process, the reactants may be added to a suitable reactor, such as a mixing vessel. The appropriate amount of ceramic seed particle, at least two monomers, in embodiments from about two to about ten monomers, surfactant(s), optional stabilizer, initiator, if any, chain transfer agent, if any, and the like, may be combined in the reactor and the emulsion polymerization process may be allowed to begin. The polymerization proceeds to form a resin catalyst of the present disclosure, including both the ceramic seed and the resin formed from the above monomers and optional stabilizer.

In embodiments, the ceramic seed particle, at least two monomers, and the stabilizer may be added to the reactor, followed by the addition of more monomers, which may be the same or different as the at least two monomers, additional ceramic, which may be the same or different as the ceramic used as the seed particle, and optionally additional stabilizer, and a resin catalyst possessing a core/shell configuration and/or multiple layers may be recovered.

Reaction conditions selected for effecting the emulsion polymerization include temperatures of, for example, from about 45° C. to about 120° C., in embodiments from about 60° C. to about 90° C.

In embodiments, a gel latex may be utilized to form a latex resin suitable for producing a resin catalyst composition. A "gel latex" may include, in embodiments, for example, a crosslinked resin or polymer, or mixtures thereof, or a non-crosslinked resin that has been subjected to crosslinking.

In embodiments, a crosslinker, such as divinyl aromatic or divinyl acrylate or methacrylate monomers, or diacrylic or dimethacrylic monomers, may be used to form the crosslinked resin. Suitable crosslinkers include, but are not limited to, divinyl benzene, dodecane diacrylate, 1,4-butane diacrylate, decanediol diacrylate, azidobenzoyl hydrazide, 4-(p-azidosalicylamido)butylamine (ASBA), 1-ethyl-3-(3-dimethylaminopropyl)carbodiimide hydrochloride (EDC), combinations thereof, and the like. The crosslinker may be present in an amount of from about 0.01 percent by weight to about 25 percent by weight of the crosslinked resin, and in embodiments of from about 0.5 to about 15 percent by weight of the crosslinked resin.

In embodiments, the gel latex may include a crosslinked resin as described above combined with a non-crosslinked resin.

The gel latex may include, for example, submicron crosslinked resin particles having a size of, for example, from about 10 nanometers to about 200 nanometers in volume average diameter, in embodiments of from about 20 nanometers to 100 nanometers in volume average diameter. The gel latex may be suspended in the aqueous phase of water containing a surfactant as described above. The surfactant may be present in an amount from about 0.5 to about 5 percent by weight of the solids, and in embodiments from about 0.7 to about 2 percent by weight of the solids.

The crosslinked resin may be a crosslinked polymer including any of the resins described above. Examples of such crosslinked resins include crosslinked styrene acrylates, styrene butadienes, and/or styrene methacrylates. Exemplary crosslinked resins include, but are not limited to, crosslinked poly(styrene-alkyl acrylate), poly(styrene-butadiene), poly (styrene-isoprene), poly(styrene-alkyl methacrylate), poly (styrene-alkyl acrylate-acrylic acid), poly(styrene-butadiene-acrylic acid), poly(styrene-isoprene-acrylic acid), poly (styrenealkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile acrylic acid), crosslinked poly(alkyl acrylate-acrylonitrile-acrylic acid), and combinations thereof.

In embodiments initiators may be added for formation of the gel latex, the latex, or both. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and mixtures thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]di-hydrochloride, 2,2'-azobis [N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2- methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis {2-[1-(2-hydroxyethyl)-2-imidazolin-2-yl]propane}dihydrochloride, combinations thereof, and the like.

Initiators can be added in suitable amounts, such as from about 0.1 to about 8 weight percent of the monomers, and in embodiments of from about 0.2 to about 5 weight percent of the monomers.

In embodiments, chain transfer agents may be used in forming the gel latex, the latex, or both. Suitable chain transfer agents include, but are not limited to, dodecane thiol, octane thiol, carbon tetrabromide, combinations thereof, and the like, in amounts from about 0.05 to about 10 percent by weight of the monomers and, in embodiments, from about 0.1 to about 5 percent by weight of monomers, to control the molecular weight properties of the polymer when emulsion polymerization is conducted in accordance with the present disclosure.

In embodiments, a gel latex may be formed as described in U.S. Pat. No. 7,307,111 and U.S. Patent Application Publication Nos. 2007/0207400, 2007/0037086, and 2006/0269858, the disclosures of each of which are hereby incorporated by reference in their entirety.

The amount of gel latex in a latex polymer may be from about 0.1% to about 20% by weight of the other monomers utilized to form the latex, in embodiments from about 0.5% to about 10% by weight of the other monomers utilized to form the latex.

Wax

Wax dispersions may then be added to a latex resin described above to produce resin catalysts of the present disclosure. Suitable waxes include, for example, submicron wax particles having a size of from about 50 to about 1000 nanometers, in embodiments of from about 100 to about 500 nanometers in volume average diameter, suspended in an aqueous phase of water and an ionic surfactant, nonionic surfactant, or mixtures thereof. Suitable surfactants include those described above. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

Examples of polypropylene and polyethylene waxes include those commercially available from Allied Chemical and Baker Petrolite, including POLYWAX 725®, a polyethylene wax from Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. In embodiments, commercially available polyethylene waxes may possess a weight average molecular weight (Mw) of from about 100 to about 5000, and in embodiments of from about 250 to about 2500, while the commercially available polypropylene waxes may have a molecular weight of from about 200 to about 10,000, and in embodiments of from about 400 to about 5000. Other spacers, such as polymer spacers, may be used instead of wax.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL 74, 89, 130, 537, and 538, all available from SC Johnson Wax, or chlorinated polypropylenes and polyethylenes commercially available from Allied Chemical, Petrolite Corporation, and SC Johnson Wax.

The wax may be present in an amount of from about 0.1 to about 30 percent by weight of the resin catalyst, and in embodiments from about 2 to about 20 percent by weight of the resin catalyst.

In embodiments, the use of a wax in the resin catalysts of the present disclosure may act as a spacer in the resulting particles and thus assist in controlling the porosity of the resin catalysts of the present disclosure.

Coagulants

In embodiments, a coagulant may be added during or prior to aggregating the latex, ceramic, and wax. The coagulant may be added over a period of time of from about 1 minute to about 60 minutes, in embodiments from about 1.25 minutes to about 20 minutes, depending on the processing conditions.

Examples of coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. One suitable coagulant is PAC, which is commercially available and can be prepared by the controlled hydrolysis of aluminum chloride with sodium hydroxide. Generally, PAC can be prepared by the addition of two moles of a base to one mole of aluminum chloride. The species is soluble and stable when dissolved and stored under acidic conditions if the pH is less than about 5. The species in solution is believed to be of the formula $Al_{13}O_4(OH)_{24}(H_2O)_{12}$, with about 7 positive electrical charges per unit.

In embodiments, suitable coagulants include a polymetal salt such as, for example, polyaluminum chloride (PAC), polyaluminum bromide, or polyaluminum sulfosilicate. The polymetal salt can be in a solution of nitric acid, or other diluted acid solutions such as sulfuric acid, hydrochloric acid, citric acid or acetic acid. The coagulant may be added in amounts from about 0.01 to about 5 percent by weight of the resin catalyst, in embodiments from about 0.1 to about 3 percent by weight of the resin possessing catalyst.

Aggregating Agents

Any aggregating agent capable of causing complexation might be used in forming resin catalysts of the present disclosure. Both alkali earth metal or transition metal salts can be utilized as aggregating agents. In embodiments, alkali (II) salts can be selected to aggregate latex resin colloids with the ceramic particles described above. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally combinations thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, combinations thereof, and the like.

pH Adjustment Agent

In some embodiments a pH adjustment agent may be added to the latex, ceramic particles, waxes, and optional additives, to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally combinations thereof. Suitable acids include nitric acid, sulfuric acid, hydrochloric acid, citric acid, acetic acid, and optionally combinations thereof.

Once the appropriate final size of the resin catalyst particles is achieved, the pH of the mixture may be adjusted with a base to a value of from about 3.5 to about 7, and in embodiments from about 4 to about 6.5. The base may include any suitable base such as, for example, alkali metal hydroxides such as, for example, sodium hydroxide, potassium hydroxide, and ammonium hydroxide. The alkali metal hydroxide may be added in amounts from about 0.1 to about 30 percent by weight of the mixture, in embodiments from about 0.5 to about 15 percent by weight of the mixture.

The resultant blend of latex, optionally in a dispersion, stabilizer, optional wax, optional coagulant, and optional aggregating agent, may then be stirred and heated to a temperature below the Tg of the latex, in embodiments from about 30° C. to about 70° C., in embodiments of from about 40° C. to about 65° C., for a period of time of from about 0.2 hours to about 6 hours, in embodiments from about 0.3 hours to about 5 hours, to form aggregated particles.

Shell

In embodiments, as noted above, an optional shell may then be formed on the aggregated particles. Any latex described above to form the latex may be utilized to form the shell latex. In embodiments, a styrene-n-butyl acrylate copolymer may be utilized to form the shell latex. In embodiments, the latex utilized to form the shell may have a glass transition temperature of from about 35° C. to about 75° C., in embodiments from about 40° C. to about 70° C.

Where used, the shell latex may be applied by any method within the purview of those skilled in the art, including dipping, spraying, and the like. The shell latex may be applied until the desired final size of the resin catalyst particles is achieved, in embodiments from about 2 microns to about 10 microns, in other embodiments from about 4 microns to about 8 microns.

In embodiments, a shell applied to a resin catalyst particle of the present disclosure may include a ceramic catalyst, which may be the same or different as the ceramic catalyst utilized as the seed particle. Thus, in embodiments, a single component catalyst may be formed following the process of the present disclosure. Alternatively, in other embodiments, a multiple component catalyst may be formed utilizing the processes of the present disclosure. For example, multiple components can be built on top of each other in a core/shell structure as described above. In this way, various potentially incompatible ceramics may be combined by using a core/shell process where layers of resins described above, possessing other ceramics containing catalysts described above, in embodiments different ceramics, may be added to a previously formed core or layer. Once the desired size, number of layers, and shape is achieved, the process may then be stopped.

Coalescence

The mixture of latex, ceramic, optional wax, and any additives, is subsequently coalesced. Coalescing may include stirring and heating at a temperature of from about 80° C. to about 99° C., for a period of from about 0.5 to about 12 hours, and in embodiments from about 1 to about 6 hours. Coalescing may be accelerated by additional stirring.

In embodiments, the pH of the mixture may then be lowered to from about 3.5 to about 6 and, in embodiments, to from about 3.7 to about 5.5 with, for example, an acid, to further coalesce the resin catalyst aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time of from about 1 hour to about 8 hours, in embodiments from about 1.5 hours to about 5 hours.

In embodiments, cooling a coalesced resin catalyst may include quenching by adding a cooling media such as, for example, ice, dry ice and the like, to effect rapid cooling to a temperature of from about 20° C. to about 40° C., in embodiments of from about 22° C. to about 30° C. For larger scale processes, such as for example greater than about 10 liters in size, rapid cooling of the resin catalyst mixture may be feasible by a counterflow heat exchanger. In the case of a 6000 gallon reaction, a spiral flow heat exchanger may be utilized to quench 23,000 kg of slurry from about 85° C. to less than about 40° C. over a period of about 40 minutes. The heat exchanger has a surface area of about 1320 ft$^2$, is cooled by water, and can remove up to 6 million BTU/hr.

The resin catalyst may then be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including the resin catalyst particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45°

C. to about 60° C. The drying may be continued until the moisture level of the particles is below a set target of about 1% by weight, in embodiments of less than about 0.7% by weight.

The resin catalyst of the present disclosure thus produced may possess particles having a size of from about 3 to about 10 microns, in embodiments from about 4 to about 8 microns. The resulting resin catalyst particles may have a circularity of from about 0.9 to about 0.99, in embodiments of from about 0.94 to about 0.98. The surface area of the resin catalyst, as determined by multipoint BET, can be from about 1 $m^2/g$ to about 1000 $m^2/g$, in embodiments from about 40 $m^2/g$ to about 400 $m^2/g$.

Helium pycnometry and/or mercury intrusion porosimetry (MIP) can be used to quantify size, shape and distribution of pores down to 0.3 μm. Other techniques like SEM could be used to measure smaller pores. Depending on the size of any spacing particles utilized, in embodiments waxes or other polymer spacers, pore sizes can be from about 0.1 nm to about 100 nm, in embodiments from about 1 nm to about 50 nm. Burnout of the spacer particle during sintering can cause gas evolution which creates very small pores as the gas escapes.

The amount of ceramic utilized in forming a resin catalyst may be from about 1 percent by weight to about 50 percent by weight of the resin catalyst, in embodiments from about 2 percent by weight to about 25 percent by weight of the resin catalyst, in embodiments from about 4 percent by weight to about 12 percent by weight of the resin catalyst, with the resin being present in an amount from about 50 percent by weight to about 99 percent by weight of the resin catalyst, in embodiments from about 75 percent by weight to about 98 percent by weight of the resin catalyst.

Sintering

Once formed, the composite resin catalyst particles may be subsequently sintered making use of a heating schedule that drives off the polymer resin and wax, and then sinters the ceramic compound(s). This results in a controlled size, shape and porosity of the final catalyst particle.

Temperatures used to sinter these ceramic materials are well above the temperatures required for the pyrolysis of the monomers utilized to form the resin and any wax utilized, in embodiments from about 400° C. to about 1600° C., in other embodiments from about 600° C. to about 1200° C.

The increase in temperature during sintering and the atmosphere applied to the powder during sintering may be maintained to cause rapid pyrolysis of the resin to a gaseous state at appropriate points of the heating schedule. Suitable atmospheres applied during the sintering process include, for example, flowing nitrogen, hydrogen, oxygen, ammonia, air, carbon dioxide, helium, argon, and combinations thereof. Vacuum can also be used.

In embodiments, the powder may be initially heated quickly to vaporize the polymer without excessive melting and flow. For example, heating may occur to a temperature of from about 25° C. to about 250° C., in embodiments from about 30° C. to about 150° C., over a period of time of from about 10 minutes to about 120 minutes, in embodiments from about 25 minutes to about 50 minutes, followed by heating to a temperature of from about 125° C. to about 1600° C., in embodiments from about 250° C. to about 1200° C., over a period of time of from about 6 hours to about 48 hours, in embodiments from about 12 hours to about 24 hours.

The above heating of the porous powder resin catalyst sinters the particles, thereby leaving a porous ceramic of controlled size, shape and porosity. The porosity of the resin catalysts of the present disclosure greatly raises the surface area of the catalyst obtained after sintering, thereby providing extremely fast reactions where the catalyst is used to catalyze a reaction.

Utilizing the processes of the present disclosure, the size, shape, and porosity of the active catalyst may be controlled to provide the correct surface area. By forming resin catalysts having a porous structure and small particle size, extremely high surface area catalysts can be obtained after sintering having a surface area, in embodiments, from about 10 $m^2/g$ to about 1000 $m^2/g$, in embodiments from about 100 $m^2/g$ to about 800 $m^2/g$. Uniform particle structure (pore size distribution), size and shape may allow for a very consistent reaction rate when used.

The resulting catalyst particles may have a size of from about 3 to about 10 μm, in embodiments from about 4 to about 8. The particles may have a Geometric shape distribution (GSD) of <1.25 D50/16 by number and <1.2 B84/50 by volume (specifies the width of the distribution. Less than 3% particles with a diameter between 1.5 μm and 3 μm. Less than 1% particles having a diameter larger than 12 μm.

The catalyst particles may have a surface area as determined by BET of from about 0.25 $m^2/g$ to about 2 $m^2/g$ for a non-porous particle, in embodiments from about 0.5 $m^2/g$ to about 0.75 $m^2/g$.

Porosity can increase the surface area to from about 1 $m^2/g$ to about 1000 $m^2/g$, in embodiments from about 20 $m^2/g$ to about 400 $m^2/g$.

Uses

The high surface area resin catalysts produced in accordance with the present disclosure provide extremely fast reactions and may be used in many industries. Air filtration, effluent gas treatment, effluent pollution control, hydrocarbon cracking, and solid oxide fuel cells are just a few applications in which the resin catalysts of the present disclosure may be used. Other applications where increased surface area of the catalyst is beneficial, and thus the resin catalyst of the present disclosure may be suitable, include air filtration, polymer reactions, and the like.

Specific exemplary uses include, for example, yttrium stabilized zirconia (YSZ) for support of a solid oxide fuel cell (SOFC) electrode material, the use of silicon dioxide as a desiccant, copper and manganese oxide for the destruction of ozone, VOC, carbon monoxide and other gasses and the like.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

A resin catalyst is prepared as follows. A 2 liter jacketed stainless steel reactor is fitted with a double P-4 impeller set at about 300 revolutions per minute (rpm). The reactor is charged with about 736 grams of deionized water and about 1.1 grams of DOWFAX™ 2A1 (47% aqueous), an alkyldiphenyloxide disulfonate from The Dow Chemical Company. The materials are deaerated for about 30 minutes while the contents of the reactor are raised to about 75° C.

A monomer emulsion is prepared by agitating a monomer mixture of styrene, n-butyl acrylate, beta-carboxyethyl acrylate (β-CEA) and 1-dodecanethiol with an aqueous solution of DOWFAX™ 2A1 and deionized water at about 300 rpm at room temperature, from about 20° C. to about 25° C. The primary particle size of the resulting emulsion is from about 100 nm to about 300 nm.

A nano sized catalyst ceramic (primary particle size 1-100 nm) is used as the seed for the styrene butyl acrylate emulsion. The seed ceramic is added to a separate reactor, optionally in a surfactant. The seed can be cerium oxide, copper oxide, nickel oxide, copper manganese or other ceramic material, or a mixture of ceramic materials. Since the ceramic is inert, it will not interfere with emulsion like a transition metal would. Seeding in this way ensures that a ceramic particle will be at the center of each emulsion particle in the final latex. After introduction of the seed, the above emulsion is added into the reactor and stirred for about 8 minutes at about 75° C.

An optional spacer polymer such as a low cost wax that is immiscible in styrene can be added to the emulsion to ensure porosity of the final product. Size and shape of this spacer component is selected to produce the desired porosity size and shape. If spherical porosity with a 50 nm size is desired, a spherical 50 nm wax spacer material is used.

Polyaluminum chloride (PAC) is added to the emulsion starting the aggregation process. As the aggregates grow, the temperature is adjusted to achieve a target size. At this time, another emulsion can be added to create a core/shell structure of active catalysts. Many layers of different catalysts can be built in this manner to create multifunctional particles in otherwise incompatible ceramics (ceramics that could not otherwise be fired as a mixture). When the target size is achieved, the pH of the emulsion is adjusted to stop further aggregation. At this point an aluminum chelating agent (such as Na-EDTA) can be added to remove aluminum (introduced by the PAC) from the final product if so desired.

The pH is adjusted and monitored to achieve a particle of a targeted shape under increased heating. Finally, the emulsion is ph adjusted, cooled or quenched, optionally sieved and washed with water and finally dried.

Full coalescence of the particle does not need to be carried out, or can be partially carried out to create a desired structure.

At this point, the powder is dry with a narrow particle size distribution, controlled size, controlled shape and controlled ceramic loading, containing optional spacer materials, such as a low cost wax.

The dried resin catalyst is then sintered, driving off the resin and wax, leaving a dry powder including the catalyst.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
adding at least one component comprising a seed catalyst selected from the group consisting of ceramics, metals, and cermets to a reactor;
adding an emulsion comprising monomer components of a latex resin to the reactor;
optionally adding an initiator to the reactor;
optionally adding additional ceramics, metals, cermets, and combinations thereof, and additional monomers comprising monomer components of a latex resin to the reactor;
adjusting pH with a base after an appropriate final size of resin catalyst particle is achieved;
recovering the resulting resin catalyst particles; and
sintering the resin catalyst particles.

2. The process of claim 1, wherein at least one ceramic, metal or cermet comprising the catalyst is selected from the group consisting of copper oxide, manganese oxide, cerium oxide, cerium (V) oxide, silicon dioxide, nickel oxide, nickel (III) oxide, lanthanum strontium, chromium, manganese, copper, yttrium, zirconium, yttrium stabilized zirconia, calcium stabilized zirconia, cobalt, titanium, vanadium, zinc, molybdenum, and combinations thereof, having a size of from about 1.5 nm to about 500 nm.

3. The process of claim 1, wherein the latex resin is selected from the group consisting of styrenes, acrylates, methacrylates, butadienes, isoprenes, acrylic acids, methacrylic acids, acrylonitriles, polyesters and combinations thereof, and wherein the resin is present in an amount of from about 50 to about 99 percent by weight of the resin catalyst.

4. The process of claim 1, further comprising contacting the emulsion in the reactor with a stabilizer of the following formula:

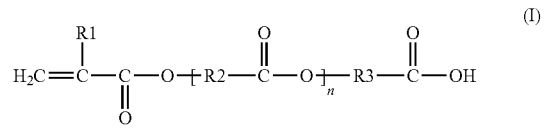

where R1 is a hydrogen or methyl group; R2 and R3 are independently selected from alkyl groups containing from about 1 to about 12 carbon atoms and a phenyl group; and n is a number of from about 0 to about 20.

5. The process of claim 4, wherein the stabilizer is selected from the group consisting of beta carboxyethyl acrylate, poly (2-carboxyethyl) acrylate, 2-carboxyethyl methacrylate, and combinations thereof.

6. The process of claim 1, wherein the additional ceramics are different than the at least one ceramic comprising a catalyst.

7. The process of claim 1, wherein the resin catalyst comprises particles having a size of from about 3 microns to about 10 microns, with a mean pore size diameter from about 0.1 run to about 100 nm and a surface area of about 1 m$^2$/g to about 1000 m$^2$/g.

8. The process of claim 1, further comprising sintering the resin catalyst by heating to a temperature of from about 400° C. to about 1600° C. to obtain catalyst particles having a volume average diameter of from about 4 μm to about 8 μm, a surface area of from about 1 to about 1000 m$^2$/g, with a mean pore size diameter from about 0.1 nm to about 10 nm.

9. The process of claim 1, wherein sintering the resin catalyst particles comprises heating to a temperature of from about 25° C. to about 250° C. for a period of from about 10 minutes to about 120 minutes followed by heating to a temperature of from about 125° C. to about 1600° C. for a period of from about 6 hours to about 48 hours.

10. A process comprising:
adding at least one ceramic comprising a seed catalyst to a reactor;
adding an emulsion comprising monomer components of a latex resin to the reactor;
optionally adding an initiator to the reactor;
optionally adding additional ceramics and additional monomers comprising a latex resin to the reactor;

adjusting pH with a base after an appropriate final size of resin catalyst particle is achieved; and recovering the resulting resin catalyst particles; and sintering the resin catalyst particles by heating to a temperature of from about 400° C. to about 1600° C. to obtain catalyst particles.

11. The process of claim 10, wherein the at least one ceramic comprising the catalyst is selected from the group consisting of copper oxide, manganese oxide, cerium oxide, cerium (V) oxide, silicon dioxide, nickel oxide, nickel (III) oxide, lanthanum strontium, chromium, manganese, copper, yttrium, zirconium, yttrium stabilized zirconia, calcium stabilized zirconia, cobalt, titanium, vanadium, zinc, molybdenum, and combinations thereof.

12. The process of claim 10, wherein the latex resin is selected from the group consisting of styrenes, acrylates, methacrylates, butadienes, isoprenes, acrylic acids, methacrylic acids, acrylonitriles, polyesters and combinations thereof, and wherein the resin is present in an amount of from about 50 to about 99 percent by weight of the resin catalyst.

13. The process of claim 10, further comprising contacting the emulsion in the reactor with a stabilizer of the following formula:

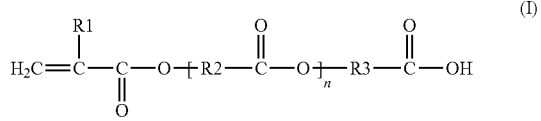

(I)

where R1 is a hydrogen or methyl group; R2 and R3 are independently selected from alkyl groups containing from about 1 to about 12 carbon atoms and a phenyl group; and n is a number of from about 0 to about 20.

14. The process of claim 13, wherein the stabilizer is selected from the group consisting of beta carboxyethyl acrylate, poly(2-carboxyethyl) acrylate, 2-carboxyethyl methacrylate, and combinations thereof.

15. The process of claim 10, wherein the additional ceramics are different than the at least one ceramic comprising a catalyst.

16. The process of claim 10, wherein the resin catalyst comprises particles having a size of from about 3 microns to about 10 microns.

17. The process of claim 10, wherein sintering produces catalyst particles having a volume average diameter of from about 4 μm to about 8 μm, a surface area of from about 1 m²/g to about 1000 m²/g, and a mean pore size diameter from about 0.1 nm to about 10 nm.

18. A process comprising:

adding at least one ceramic comprising a seed catalyst selected from the group consisting of copper oxide, manganese oxide, cerium oxide, cerium (V) oxide, silicon dioxide, nickel oxide, nickel (III) oxide, lanthanum strontium, chromium, manganese, copper, yttrium, zirconium, yttrium stabilized zirconia, calcium stabilized zirconia, cobalt, titanium, vanadium, zinc, molybdenum, and combinations thereof, to a reactor;

adding an emulsion comprising monomer components of a latex resin selected from the group consisting of styrenes, acrylates, methacrylates, butadienes, isoprenes, acrylic acids, methacrylic acids, acrylonitriles, and combinations thereof to the reactor;

contacting the emulsion in the reactor with a stabilizer of the following formula:

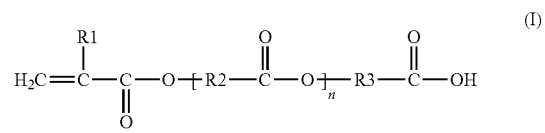

(I)

where R1 is a hydrogen or methyl group; R2 and R3 are independently selected from alkyl groups containing from about 1 to about 12 carbon atoms and a phenyl group; and n is a number of from about 0 to about 20;

optionally adding an initiator to the reactor;

adding additional ceramics and additional monomers comprising a latex resin to the reactor;

adjusting pH with a base after an appropriate final size of resin catalyst particle is achieved; and recovering the resulting resin catalyst particles; and sintering the resin catalyst particles by heating to a temperature of from about 400° C. to about 1600° C. to obtain catalyst particles.

19. The process of claim 18, wherein the stabilizer is selected from the group consisting of beta carboxyethyl acrylate, poly(2-carboxyethyl) acrylate, 2-carboxyethyl methacrylate, and combinations thereof.

20. The process of claim 18, wherein the additional ceramics are different than the at least one ceramic comprising the catalyst.

21. The process of claim 18, wherein the resin catalyst comprises particles having a size of from about 3 microns to about 10 microns, and wherein sintering produces catalyst particles having a volume average diameter of from about 4 μm to about 8 μm, a surface area of from about 1 m²/g to about 1000 m²/g, and a mean pore size diameter from about 0.1 nm to about 10 nm.

* * * * *